United States Patent [19]

Ishibashi et al.

[11] Patent Number: 4,607,354
[45] Date of Patent: Aug. 19, 1986

[54] AUTOMATIC DISC LOADING AND EXCHANGING APPARATUS

[75] Inventors: Masaya Ishibashi; Masaaki Kiyomiya, both of Tokorozawa, Japan

[73] Assignee: Pioneer Electronic Corporation, Tokyo, Japan

[21] Appl. No.: 639,470

[22] Filed: Aug. 10, 1984

[30] Foreign Application Priority Data

Aug. 12, 1983 [JP] Japan .................................. 58-147829

[51] Int. Cl.⁴ .......................... G11B 17/00; G11B 5/48
[52] U.S. Cl. ......................................... 369/39; 369/34; 369/36
[58] Field of Search .................. 369/34, 36, 38, 39

[56] References Cited

U.S. PATENT DOCUMENTS

| | | | |
|---|---|---|---|
| 3,378,264 | 4/1968 | Foufounis | 369/39 |
| 4,273,342 | 6/1981 | Gilson et al. | 369/39 |
| 4,504,936 | 3/1985 | Faber et al. | 369/39 |

Primary Examiner—Steven L. Stephan
Attorney, Agent, or Firm—Fleit, Jacobson, Cohn & Price

[57] ABSTRACT

An automatic disc loading and exchanging apparatus of a disc reproducing system including a disc drive unit, comprising a disc storage unit for storing a plurality of discs in conjunction with the disc drive means in a manner that the discs are arranged in an array, a disc retainer to have a disc retained in a position to be driven for rotation by the disc drive unit, and a disc transport assembly movable in parallel with the array of the discs independently of the disc retainer and including a disc carrier adapted to carry at least two discs. The disc transport assembly is movable between a first position operative to have a disc transferred between the array of the discs and the disc carrier and a second position operative to have a disc transferred between the disc carrier and the disc retainer. The first position is variable depending upon the disc to be transferred between the array of the discs and the disc carrier, while the second position is fixed with respect to the disc retainer.

8 Claims, 11 Drawing Figures

Fig. 6A
Fig. 6B
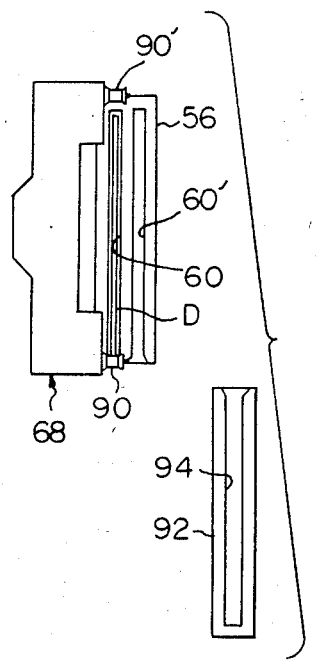
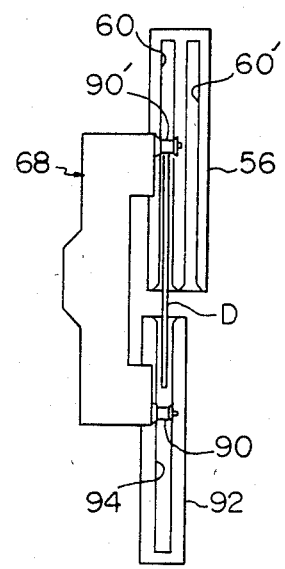

AUTOMATIC DISC LOADING AND EXCHANGING APPARATUS

FIELD OF THE INVENTION

The present invention relates to an automatic disc loading and exchanging apparatus for use in a disc reproducing system such as, typically, a video and/or audio disc player.

BACKGROUND OF THE INVENTION

An automatic disc loading and exchanging apparatus for use in a video and/or audio disc player is known which is capable of automatically selecting a disc or discs from the stock of video and/or audio discs and loading the selected disc or discs into a disc drive unit. An example of a video and/or audio disc player equipped with such a disc loading and exchanging apparatus is shown in Japanese Patent Application No. 56-67396. In the disc loading and exchanging apparatus disclosed in this Patent Application, a plurality of video and/or audio discs are arranged axially in alignment with one another and a disc drive unit associated with an information pickup unit is provided to be movable in parallel with the array of the discs. The locations of the individual discs in stock are detected by photoelectric transducer means and the disc drive unit is moved to a position corresponding to a selected disc in response to a signal produced by such detecting means. When the disc drive unit reaches the particular position the selected disc is transferred from the array of the discs in stock. When two or more discs are to be played back successively, the disc drive unit is first moved to a position corresponding to one of the selected discs and receives the first disc. Upon completion of the playback operation with the first disc, the disc is returned to the array of the discs in stock and thereupon the disc drive unit is moved to a position corresponding to a second selected disc. Thus, there is a considerable length of time interval between the termination of the reproduction of one disc and the start of the reproduction of another. The present invention contemplates provision of an disc loading and exchanging apparatus in which exchange of discs can be effected without involving such a time interval.

SUMMARY OF THE INVENTION

In accordance with the present invention, there is provided an automatic disc loading and exchanging apparatus of a disc reproducing system including disc drive means associated with disc information pickup means, comprising disc storage means for storing a plurality of discs in conjunction with the disc drive means, the disc storage means being adapted to have the discs arranged in an array having the individual discs axially spaced apart a predetermined distance from each other and aligned with one another in a predetermined direction with respect to the disc drive means, disc retaining means adapted to have a disc retained in a position to be driven for rotation by the disc drive means, and disc transport means movable in parallel with the array of the discs independently of the disc retaining means and including a disc carrier adapted to carry at least two discs, the disc transport means being movable between a first position operative to have a disc transferred between the array of the discs and the disc carrier and a second position operative to have a disc transferred between the disc carrier and the disc retaining means, the first position being variable depending upon the disc to be transferred between the array of the discs and the disc carrier, the second position being fixed with respect to the disc retaining means.

In the automatic disc loading and exchanging apparatus thus constructed and arranged the disc transport means may further include a carriage movable with respect to the disc retaining means in parallel with the array of the discs, and a slider movable with respect to the carriage in a direction substantially perpendicularly to the direction of movement of the carriage with respect to, the disc carrier being movable with the carriage in parallel with the array of the discs and having at least two parallel open spaces or gaps separate from each other and each adapted to have a disc received therein. In this instance, the disc retaining means may comprise a disc retainer positioned close to the disc drive means and formed with at least one open space or gap adapted to have a disc received therein in a position ready to be engaged by the disc drive means.

BRIEF DESCRIPTION OF THE DRAWINGS

The features and advantages of an automatic disc loading and exchanging apparatus according to the present invention will be more clearly appreciated from the following description taken in conjunction with the accompanying drawings in which:

FIGS. 6A and 6B are views showing members of the apparatus embodying the present invention under conditions in which a disc is to be transferred from the stock of discs to a position ready to be played back.

DESCRIPTION OF THE PREFERRED EMBODIMENT

While a disc loading and exchanging apparatus embodying the present invention will be hereinafter described as being used in a video and/or audio disc player, it should be borne in mind that an apparatus according to the present invention is applicable not only to a video and/or audio disc player but also to any other types of systems and devices using information carrying discs.

Figure 1:
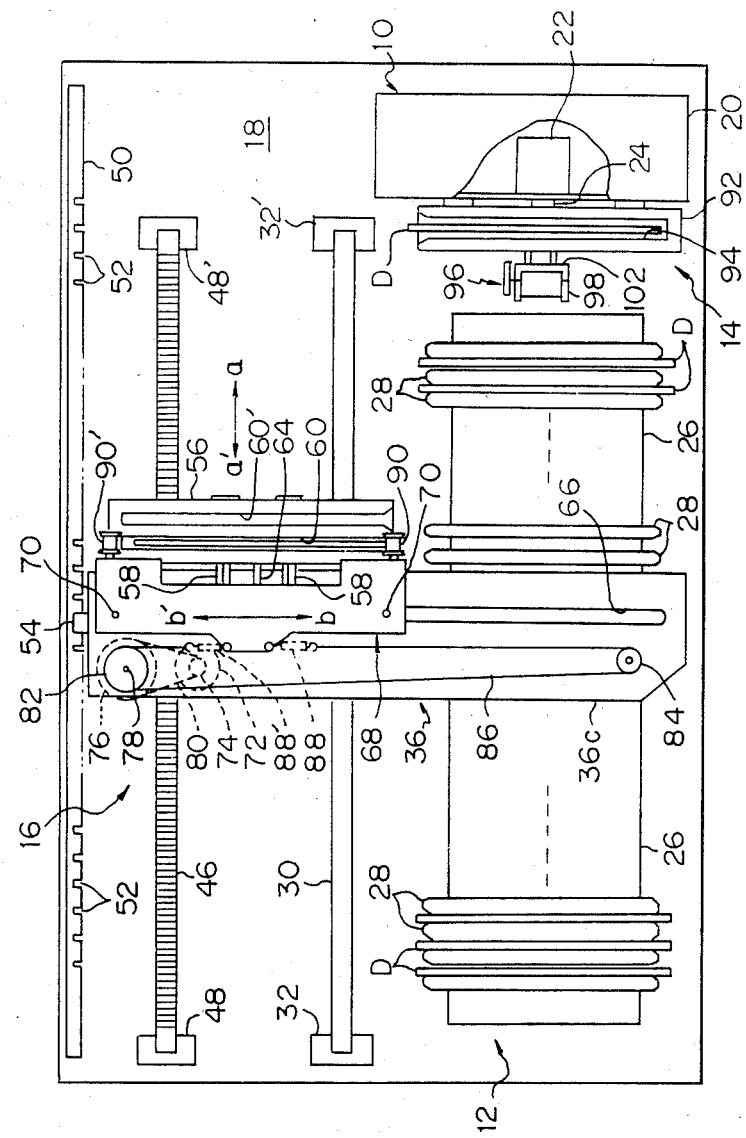
FIG. 1 is a plan view showing the mechanical construction and arrangement of an automatic disc loading and exchanging apparatus embodying the present invention.
Figure 2:
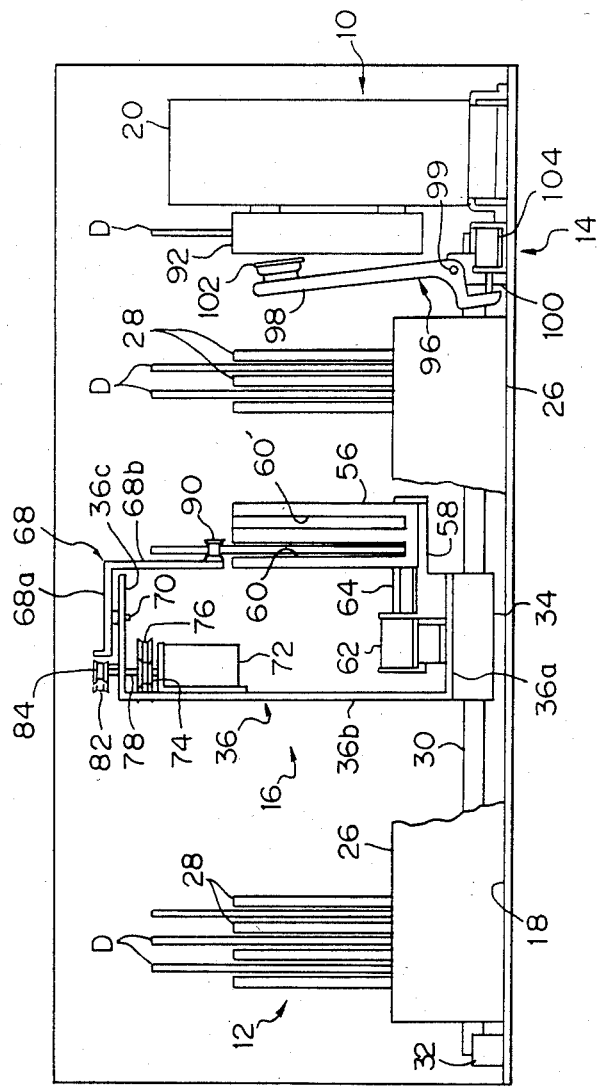
FIG. 2 is a front elevation view of the disc loading and exchanging apparatus illustrated in FIG. 1.
Figure 3:
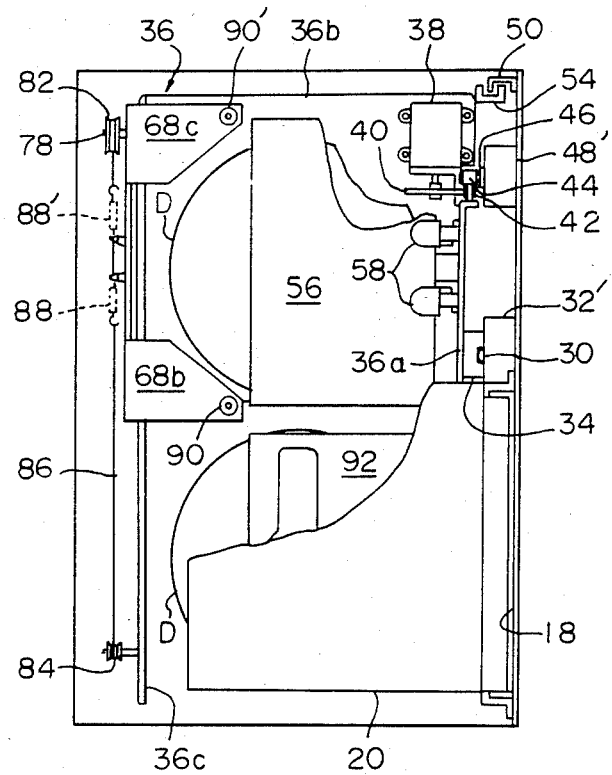
FIG. 3 is a side view of the disc loading and exchanging apparatus illustrated in FIGS. 1 and 2.

Referring to the drawings, first concurrently to FIGS. 1 to 3 thereof, an automatic disc loading and exchanging apparatus embodying the present invention is provided in conjunction with a disc drive unit 10 of, for example, a video and/or audio disc player and largely comprises disc storage means 12, disc retaining means 14 and disc transport means 16. The disc storage means 12 is provided on a front half portion of the base plate 18 and is adapted to have a number of video and/or audio discs D stowed in conjunction with the disc drive unit 10. The disc retaining means 14 is also provided on a front half portion of the base plate 18 and is adapted to have a disc retained in a position to be driven for rotation by means of the drive unit 10. The disc transport means 16 is provided on a rear half portion of the base plate 18 and is adapted to pick up one of the video and/or audio discs D retained by the disc storage means 12 and to convey the disc to the disc retaining means 14. The disc storage means 12, disc retaining means 14 and disc transport means 16 as well at the disc drive unit 10 are mounted on a flat horizontal base plate or chassis 18 which forms part of the casing structure of the disc player. The disc drive unit 10 comprises a casing 20 securely mounted on the base plate 18 and has a suitable ac or dc motor 22 having an output shaft 24 rotatable about a horizontal axis in a longitudinal direction of the disc loading and exchanging apparatus. The output shaft 24 of the motor 22 is secured to or integral with a disc drive spindle (not shown) to which the video and/or audio disc conveyed to the disc retaining means 14 by the disc storage means 12 is to be fitted through the central aperture in the disc. The disc drive unit 20 is thus adapted to drive a video and/or audio disc for rotation about the axis of rotation of the disc drive spindle during playback operation of the disc player. Though not shown in the drawings, furthermore, the disc drive unit 10 is associated with a suitable disc information pickup unit adapted to pick up information from the video and/or audio disc fitted to the drive spindle during operation of the disc player as well known in the art. The disc information pickup unit is driven by a pickup drive motor adapted to drive the pickup unit to move radially of the disc to be played back as well known in the art.

The disc storage means 12 is, more specifically, adapted to have the stock of the video and/or audio discs D arranged in an array with the individual discs axially spaced apart a predetermined distance from each other and aligned with one another in a predetermined direction with respect to the disc drive unit 10. In the embodiment herein shown, the direction in which the discs D stored on the disc storage means 12 are thus maintained in alignment with one another is parallel with the axis of the drive spindle connected to or integral with the output shaft 24 of the motor 22. Such disc storage means 12 comprises a unitary disc support structure 26 fixedly mounted on the base plate 18 and horizontally elongated in line with the output shaft 24 of the motor 22, and a number of parallel vertical separator plates 28 each having a lower portion fixedly embedded in or otherwise secured to the disc support structure 26. The separator plates 28 are spaced apart a predetermined distance from each other in the above mentioned predetermined direction in which the discs D retained by the disc storage means 12 are maintained in alignment with one another, thus forming a number of parallel gaps between the individual separator plates 28. The distance between the adjacent two of these separator plates 28 is slightly larger than the thickness of the discs D so that each of the discs D retained by the disc storage means 12 is loosely received in the gap between every adjacent two of the separator plates 28 with an upper portion of the disc projecting upwardly from the gap as will be seen from FIGS. 1 and 2.

On the other hand, the disc transport means 16 of the apparatus embodying the present invention comprises at least one guide bar 30 elongated in parallel with the direction in which the discs D retained by the disc storage means 12 are maintained in alignment with one another. The guide bar 30 extends between opposite lengthwise end portions of the base plate 18 in parallel with the array of the separator plates 28 of the disc storage means 12, viz., the array of the discs D in stock and is secured at both ends thereof to the base plate 18 by suitable coupling elements 32 and 32'. A slide block 34 (FIG. 2) is carried on the guide bar 30 and is slidable on and along the guide bar 30. The slide block 34 has securely supported thereon a carriage 36 having a lower base portion 36a securely attached to the slide block 34, an upright panel portion 36a extending upwardly from the lower base portion 36b, and a horizontal support portion 36c elongated in a direction perpendicular to the guide bar 30. The horizontal support portion 36c of the carriage 36 has its longitudinal end portions above front and rear end portions, respectively, of the base plate 18 as shown in FIG. 1 and partially hangs over the array of the discs D in stock. The carriage 36 thus configured is provided with drive means adapted to drive the carriage 36 for movement on and along the guide bar 30. As shown in FIG. 3, the drive means comprises a reversible drive motor 38 mounted on the upright panel portion 36b of the carriage 36 and located adjacent the lower end of the panel portion 36b. The motor 38 has securely carried on its output shaft a driving gear 40 having an axis of rotation perpendicular to the guide bar 30. The driving gear 40 is held in mesh with a driven gear 42 securely connected to or integral with a pinion 44 having an axis of rotation parallel with the axis of rotation of the driving gear 40. The pinion 44 is rotatably carried on a shaft secured to the upright panel portion 36b of the carriage 36 and is held in mesh with a rack bar 46 extending in parallel with the guide bar 30 and secured at both ends thereof to the base plate 18 by suitable coupling elements 48 and 48' as shown in FIG. 1. When the drive motor 38 is actuated so that the output shaft thereof is driven for rotation in one direction, the pinion 44 is driven for rotation about its axis by means of the gears 40 and 42 and is caused to roll on the rack bar 46, causing the carriage 36 to move in one direction on and along the guide bar 30 and the rack bar 46. The carriage 36 as a whole is thus operative to move in a direction of arrow a in which the support portion 36c of the carriage 36 moves closer to the disc drive unit 10 and a direction of arrow a' in which the support portion 36c of the carriage 36 moves away from the disc drive unit 10. The above mentioned drive means is thus composed of the motor 38, gears 40 and 42, pinion 44 and rack bar 46.

The movement of the carriage 36 along the guide bar 30 is monitored by suitable carriage position detecting means which is adapted to produce a signal indicative of a distance of movement of the carriage 36 from a predetermined home position with respect to the array of the discs D in stock and to the disc retaining means 14 to be described. In the embodiment herein shown, such detecting means comprises a toothed bar 50 elongated in parallel with the rack bar 46 and securely attached to the base plate 18 by suitable fastening means (not shown). The toothed bar 50 extends along the rear end of the base plate 18 as shown in FIG. 1 and is formed with a series of teeth which are equidistantly spaced apart from each other so that a series of slots 52 are formed at predetermined regular intervals longitudinally of the member 50. The detecting means further comprises a photoelectric transducer 54 movable along the toothed bar 50 and secured to the upright panel portion 36b of the carriage 36 adjacent the lower end of the panel portion 36c as will be best seen from FIG. 3. The photoelectric transducer 54 has a generally U-shaped cross section and comprises light emitting and receiving portions having the toothed bar 50 loosely interposed therebetween. When the carriage 36 is caused to move along the guide bar 30 and accordingly the photoelectric transducer 54 is caused to move along the toothed bar 50, the beam of light emitted from the light emitting portion of the transducer 54 is permitted to reach the light receiving portion of the transducer 54 intermittently through the slots 52 in the toothed bar 50. A series of electric signals in the form of pulses is thus produced by the photoelectric transducer 54 as the carriage 36 is caused to move along the guide bar 30 toward or away from the above mentioned home position of the carriage 36 with respect to the array of the discs D in stock. As will be described in more detail, these pulses are counted by suitable pulse counting means, which is thus operative to produce a signal indicative of a distance of the carriage 36 from the home position thereof with respect to the array of the discs D.

The carriage 36 has supported thereon a disc carrier 56 by means of a pair of guide members 58 movable on the lower base portion 36a of the carriage 36 in directions parallel with the guide bar 30, the disc carrier 56 being thus movable with respect to the carriage 36 in a direction parallel with the guide bar 30. The disc carrier 56 has three parallel wall portions which are spaced apart from each other in a direction parallel with the guide bar 30. Between these wall portions of the disc carrier 56 are thus formed a pair of, first and second, gaps 60 and 60' which are parallel with the gaps between the separator plates 28 of the disc storage means 12 as will be best seen from FIG. 1. The gaps 60 and 60' are generally rectangular in shape and are isolated from each other by the intermediate one of the three wall portions. Each of the gaps 60 and 60' is open along the upper and front ends thereof and has a width slightly larger than the thickness of a disc D. Thus, the disc carrier 56 is adapted to have a disc D received in each of the gaps 60 and 60' with an upper end portion projecting from the upper end of the gap as shown in FIGS. 2 and 3. The gaps 60 and 60' are located on a horizontal plane on which the gaps between the separator plates 28 of the disc storage means 12 are located as will be seen from FIG. 2. As will be seen from FIGS. 2 and 3, furthermore, the gaps 60 and 60' in the disc carrier 56 have vertical measurements or heights less than the diameter of discs D for use in the apparatus embodying the present invention and horizontal measurements or depths not less than the diameter of the discs D. The disc carrier 56 constructed and arranged as above described is driven for movement with respect to the carriage 36 in a direction parallel with the guide bar 30 by suitable drive means. In the embodiment herein shown, such drive means comprises a solenoid-operated actuator unit 62 supported on the lower base portion 36a of the carriage 36 and having a plunger 64 extending in a direction parallel with the guide bar 30 and securely connected at its leading end to a lower portion of one outer wall of the disc carrier 56 as shown in FIG. 2.

The upper support portion 36c of the carriage 36 is formed with an elongated slot 66 extending perpendicularly to the guide bar 30 between the vicinities of the front and rear ends of the support portion 36c as will be seen from FIG. 1. On the upper face of the support portion 36c of the carriage 36 is carried a slider 68 which has a horizontal upper panel portion 68a overlying the support portion 36c of the carriage 36, and a pair of vertical lug portions 68b and 68c depending from the upper panel portion 68a and spaced apart from each other in a direction parallel with the guide slot 66 in the support portion 36c of the carriage 36 as will be best seen from FIG. 3. The upper panel portion 68a of the slider 68 is slidably fitted to the support portion 36c of the carriage 36 by means of guide pins 70 projecting downwardly from the lower face of the panel portion 68a of the slider 68 into the guide slot 66 in the support portion 36c of the carriage 36. The slider 68 is thus slidable on the upper face of the support portion 36c of the carriage 36 forwardly or in a direction of arrow b toward a foremost position above the array of the discs D in stock and rearwardly or in a direction of arrow b' toward a rearmost position above the guide and rack bars 30 and 46 as shown in FIGS. 1 and 3. The slider 68 is driven to move in these directions of the arrows b and b' by suitable drive means. In the embodiment herein shown, such drive means comprises a reversible drive motor 72 mounted on the upright panel portion 36b of the carriage 36 and first and second belt and pulley arrangements providing driving connection from the motor 72 to the slider 68 and each including pulleys having vertical axes of rotation fixed with respect to the carriage 36. The first belt and pulley arrangement comprises a driving pulley 74 securely mounted on the output shaft of the drive motor 72, and a driven pulley 76 securely carried on a shaft 78 projecting downwardly from the upper support portion 36c of the carriage 36 and rotatable about the center axis thereof with respect to the support portion 36c. An endless belt 80, which is constituted by a flexible wire in the shown embodiment, is passed between these driving and driven pulleys 74 and 76 as indicated by broken lines in FIG. 1 and transmits the rotation of the driving pulley 74 to the driven pulley 76. The shaft 78 carrying the driven pulley 76 of the first belt and pulley arrangement is located adjacent the rear end of the support portion 36c of the carriage 36, projects upwardly from the upper support portion 36c of the carriage 36 and has securely carried thereon a driving pulley 82 which forms part of the second belt and pulley arrangement. The second belt and pulley arrangement comprises, in addition to the driving pulley 82, a driven pulley 84 rotatable on a shaft projecting upwardly from the support portion 36c of the carriage 36 and located adjacent the front end of the support portion 36c as shown in FIG. 1. A belt 86, which is also constituted by a flexible wire in the shown embodiment, is passed between these driving and driven pulleys 82 and 84 and is spliced at its ends to coiled tension springs 88 and 88'. The tension springs 88 and 88' which are thus anchored each at one end thereof to the belt 86 at each end of the belt are anchored at the other ends thereof to a projection of the upper panel portion 68a of the slider 68 as shown in FIG. 1. The rotation of the driven pulley 76 of the first belt and pulley arrangement is thus transmitted through the shaft 78 to the driving pulley 82 of the second belt and pulley arrangement and is converted through the belt 86 and the tension springs 88 and 88' into movement of the slider 68 along the guide slot 66 in the carriage 36. The lug portions 68b and 68c of the slider 68 have mounted thereon front and rear press rollers 90 and 90', respectively, which are rotatable about axes parallel with the guide bar 30. These press rollers 90 and 90' are spaced apart from each other a distance slightly than the diameter of discs D or, more specifically, than the length of a chord of an upper portion of a disc D which projects outwardly from the first or second gap 60 or 60' in the disc carrier 56 as will be seen from FIG. 3. The rollers 90 and 90' are located above the disc carrier 56 or, more specifically, above the front and rear ends, respectively of the gap 60 or 60' in the disc carrier 56 when the slider 68 is held in its rearmost position on the carriage 36 as will be seen from FIG. 1.

On the other hand, the disc retaining means 14 of the apparatus embodying the present invention comprises a disc retainer 92 securely attached to the casing 20 of the disc drive unit 10. The disc retainer 92 has two parallel wall portions which are spaced apart from each other in a direction parallel with the output shaft of the motor 22 accommodated within the casing 20. Between these two wall portions of the disc retainer 92 is thus formed a gap 94 parallel with the gaps between the separator plates 28 of the disc storage means 12 as will be best seen from FIG. 1. The gap 94, which is generally rectangular in shape, is open along the upper and front ends thereof and has a width slightly larger than the thickness of a disc D. Thus, the disc retainer 92 is adapted to have a disc D received in the gap 94 with an upper end portion projecting from the upper end of the gap as shown in FIGS. 2 and 3. The gap 94 in the disc retainer 92 is located on a horizontal plane on which the gaps between the separator plates 28 of the disc storage means 12 are located as will be seen from FIG. 2. Similarly to the first and second gaps 60 and 60' in the disc carrier 56, furthermore, the gap 94 in the disc retainer 92 has a vertical measurement or height less than the diameter of discs D for use in the apparatus embodying the present invention and a horizontal measurement or depth not less than the diameter of the discs D as will be seen from FIGS. 2 and 3.

The disc retaining means 14 further comprises a disc clamper 96 including a bell-crank lever 98 having an intermediate fulcrum portion pivotally mounted on a pivot pin 99 journaled in a bracket member 100 securely attached to the base plate 18. The bell-crank lever 98 has a lower arm portion extending generally downwardly from the fulcrum portion and an upper arm portion extending upwardly from the fulcrum portion and having a clamp member 102 attached thereto as will be best seen in FIG. 2. The bell-crank lever 98 is pivotally movable about the pivot pin 99 into and out of an angular position in which the clamp member 102 is operative to hold a disc D correctly fitted to the spindle connected to the output shaft 24 of the disc drive motor 22. The bell-crank lever 98 is thus provided with drive means adapted to drive the lever 98 into and out of such an angular position. In the embodiment herein shown, the drive means comprises a solenoid-operated actuator unit 104 supported on the base plate 18 and having a plunger 106 extending in a direction parallel with the motor output shaft 24 and pivotally connected at its leading end to the lower arm portion of the bell-crank lever 98 as shown in FIG. 2.

As will have been understood from the foregoing description, the disc loading and exchanging apparatus embodying the present invention has incorporated therein four drive means. These drive means consist of the motor 38 for driving the carriage 36, the motor 72 for driving the slider 68, the solenoid-operated actuator unit 62 for driving the disc carrier 56, and the solenoid-operated actuator unit 104 for driving the bell-crank lever 98 of the disc retaining means 14. These motors 38 and 72 and the solenoid-operated actuator units 62 and 104, as well as the motor 22 forming part of the disc drive unit 10 and the motor (not shown) for driving the disc information pickup unit associated with the drive unit 20 are operated under the control of a control system illustrated in block form in FIG. 5 of the drawings.

Figure 5:
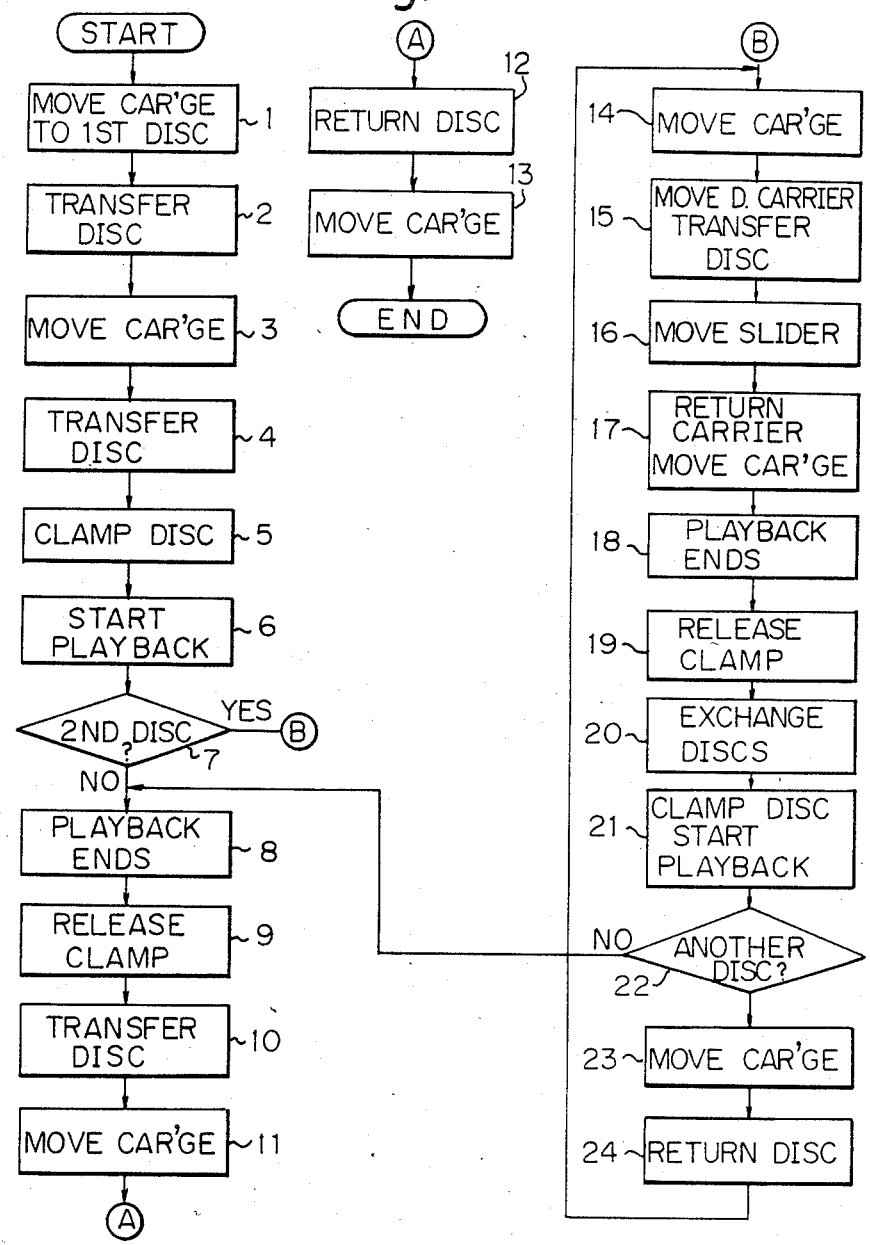
FIG. 5 is is a flowchart showing the various steps to be taken in the apparatus embodying the present invention during playback operation with one, two or more video and/or audio discs.

Referring to FIG. 5, the control system comprises various sensors and switches as sources of control signals on the basis of which the above mentioned motors and solenoid-operated actuator units are to be operated. These sensors and switches, generally designated by reference numeral 106, include a carriage position sensor 106a, a carriage movement limiter switch 106b, a slider movement limiter switch 106c, a pickup movement limiter switch 106d a disc speed sensor 106e, a disc presence/absence detector 106f, and playback information detector 106g. The carriage position sensor 106a is adapted to detect the distance of movement of the carriage 36 from the predetermined home position thereof with respect to the array of the discs D in stock and further to the disc retainer 92 forming part of the disc retaining means 14 and to produce a signal indicative of the distance of the carriage 36 from the home position thereof. In the arrangement shown in FIGS. 1 to 3, the carriage position sensor 106a is constituted by the previously described carriage position detecting means including the toothed bar 50 and the photoelectric transducer 54 (FIGS. 1 and 3). The carriage movement limiter switch 106b is responsive to movement of the carriage 36 to predetermined limit positions along the guide bar 30 and is thus operative to produce a signal to define a predetermined maximum distance of stroke of the carriage 36 along the array of the discs D in stock. The slider movement limiter switch 106c is responsive to movement of the slider 68 to predetermined limit positions along the guide slot 66 in the carriage 36 and is operative to produce a signal to define a predetermined distance of stroke of the slider 68 on the carriage 36. The pickup movement limiter switch 106d is responsive to movement of the disc information pickup unit (not shown) to predetermined radially inner and outer limit positions with respect to the disc D being played back and is operative to produce a signal to define a predetermined maximum distance of stroke of the pickup unit with respect to the disc D in the disc retainer 92 of the disc retaining means 14. The disc speed sensor 106e is responsive to variation in the speed of rotation of the disc D being driven in the disc retainer 92 by the disc drive motor 22 and is operative to produce an output signal indicative of the detected speed of rotation of the discs D. The disc presence/absence detector 106f is provided in association with the disc retaining means 14 and is adapted to detect the presence or absence of a disc D in the disc retainer 92 and to produce an output signal indicative of the presence or absence of a disc D therein. The playback information detector 106g is provided in association with a demodulator circuit (not shown) to demodulate the signals read out from a disc D by means of the disc information pickup unit and is operative to detect from the demodulated signals various control signals necessary for the reproduction of the pieces of information to be played back from a selected disc D. Such control signals include those which are indicative of the code number assigned to a piece of information to be reproduced from the selected disc D and the radially innermost and outermost limits of the record tracks on which the particular piece of information is stored in the disc D.

The signal thus produced by the sensors and switches 106 are fed through an input interface circuit 108 to a central processing unit 110 (CPU). The central processing unit 110 is further supplied with control signals from a read-only memory 112 (ROM) having memorized therein the programs in accordance with which the video and/or audio disc player is to be operated, and a random access memory 114 (RAM) having memorized therein pieces of information to be predominant over the mode of operation of the disc player. The central processing unit 110 has input and output ports connected through an input/output interface circuit 116 to a control switch unit 118 and output ports connected through an output interface circuit 120 to a suitable display unit 122. The control switch unit 118 consists of a group of control switches including switches to be used for the registration of, for example, the code number assigned to the disc to be selected and the code number assigned to the piece of information to be reproduced from the selected disc. The switch unit 118 further includes a switch used to start the disc player. The display unit 122 is used for the display of, for example, the code number of the selected disc, the code number of the selected piece of information, and the selected mode of operation of the disc player. The central processing unit 110 further has output ports connected through an output interface circuit 124 to a driver network 126 which includes driver circuits for providing electrical connection between each of the motors 22, 38, 72 and solenoid-operated actuator units 62 and 104 and a power source (not shown) therefor.

Description will be hereinafter made with reference to FIGS. 1 to 4 and further to the flowchart of FIG. 5 in regard to the operation of the apparatus constructed and arranged as hereinbefore described.

Prior to the start of the operation, a number of video and/or audio discs D are stored on the disc storage means 12 and are respectively received in the gaps between the separator plates 28 on the disc support structure 26. The carriage 36 is maintained in the predetermined home position thereof with respect to the array of the discs D in stock and the slider 68 is maintained in its rearmost position on the carriage 36 as shown in FIG. 1. Furthermore, the solenoid-operated actuator unit 62 associated with the disc carrier 56 remains de-energized so that one of the first and second gaps 60 and 60' in the disc carrier 56 such as the first gap 60 as shown is vertically aligned with the press rollers 90 and 90'. The solenoid-operated actuator unit 104 associated with the disc retainer 92 of the disc retaining means 14 also remains de-energized so that the bell-crank lever 98 is held in an angular position having the clamp member 102 positioned away from the disc retainer 92 as shown in FIG. 2.

The operation of the disc player starts with registration of the code number or numbers assigned to the disc or discs to be selected out of the stock of the discs D on the disc storage means 12 and the code number or numbers assigned to the piece or pieces of information to be reproduced from the selected disc or discs. The registration of these code numbers is effected by manipulation of some switches included in the switch unit 118 of the control system shown in FIG. 5. When the switch to dictate the start of the player is manipulated after registration of these code numbers, the motor 38 forming part of the drive means for the carriage 36 is actuated to drive the pinion 44 through the gears 40 and 42 (FIG. 3) for rotation in one direction about the axis thereof. The pinion 44 is thus driven to roll on the rack bar 46 and causes the carriage 36 to move along the guide bar 30 in the direction of the arrow a or in the direction of the arrow a' (FIG. 1) from the home position thereof to a target position corresponding to the disc selected or the first one of the two or more discs selected out of the stock of the discs D. This stage of the player operation is represented as step 1 in the flowchart of FIG. 5. While the carriage 36 is being thus driven to move from the home position to the target position, the slider 68 carried on the carriage 36 is held at rest on the carriage 36 and is moved together with the carriage 36 along the guide bar 30. When the carriage 36 reaches the target position with respect to the array of the discs D in stock, the motor 38 is de-energized to maintain the carriage 36 in the particular position and, in turn, the motor 72 which forms part of the drive means for the slider 68 (FIG. 2) is actuated by a control signal supplied from the central processing unit 110 to the driver network 124 of the control system shown in FIG. 4. The motor 72 being thus energized, the driving pulley 74 on the output shaft of the motor 72 is driven for rotation in one direction (clockwise in FIG. 1) about the axis thereof. The rotation of the driving pulley 74 is transmitted through the endless belt or wire 80 to the driven pulley 76, through the shaft 78 to the driving pulley 82 and through the wire 86 and springs 88 and 88' to the slider 68. The slider 68 is thus driven to move along the guide slot 66 in the carriage 36 in the direction of the arrow b (FIG. 1) from the rearmost position to the foremost position above the stock of the discs D. When the slider 68 reaches the foremost position on the carriage 36, the motor 72 is de-energized so that the slider 68 is held at rest in the particular position. The slider 68 being thus held in the foremost position on the carriage 36 which has been held in the position corresponding to the selected one of the discs D in stock, the press rollers 90 and 90' carried on the slider 68 are located in alignment with the particular disc D. The motor 72 is then actuated to drive the slider 68 for movement in the direction of the arrow b' from the foremost position to the rearmost position on the carriage 36 which is held at rest. It therefore follows that the front press roller 90 carried on the slider 68 is brought into engagement with the edge of the disc D aligned with the press rollers 90 and 90' so that the particular disc D is caused to move out of the array of the discs D in stock into the first gap 60 in the disc carrier 56 which is held at rest together with the carriage 36. The selected disc D is in this manner transferred into the first gap 60 in the disc carrier 56 as shown in FIG. 6A of the drawings by the time when the slider 68 reaches the rearmost position on the carriage 36. This stage of the player operation is represented as step 2 in the flowchart of FIG. 5. After the selected disc D is thus completely transferred to the disc carrier 56, the motor 38 is actuated to drive the carriage 36 for movement along the guide bar 30 in the direction of the arrow a, viz., toward the disc retainer 92 of the disc retaining means 14 until the gap 60 in the disc carrier 56 is brought into alignment with the gap 94 in the disc retainer 92. This stage of the player operation is represented as step 3 in the flowchart of FIG. 5. After the carriage 36 is moved to this position with respect to the disc retainer 92, the motor 38 is brought to a stop and in turn the motor 72 is actuated to drive the slider 68 for movement from the rearmost position to the foremost position on the carriage 36. The rear press roller 90' on the carriage 36 is thus brought into engagement with the edge of the disc D and causes the disc D to move out of the gap 60 in the disc carrier 56 into the gap 94 in the disc retainer 92 as indicated in FIG. 6B of the drawings. This stage of the player operation is represented as step 4 in the flowchart of FIG. 5. After the disc D is transferred completely from the gap 60 in the disc carrier 56 into the gap 94 in the disc retainer 92, the solenoid-operated actuator unit 104 is energized to drive the disc clamper 96 to turn about the pivot pin 99 (FIG. 3) so that the clamp member 102 on the bell-crank lever 98 is brought into pressing engagement with the disc D in the disc retainer 92 through an opening formed in the disc retainer 92 and causes the disc D to correctly fit to the spindle connected to the output shaft 24 of the disc drive motor 22. This stage of the player operation is represented as step 5 in the flowchart of FIG. 5. The step 5 is followed by step 6 in which the disc drive motor 22 and the disc information pickup unit are put into operation to start the reproduction of the selected piece of information from the disc D.

Figure 4:
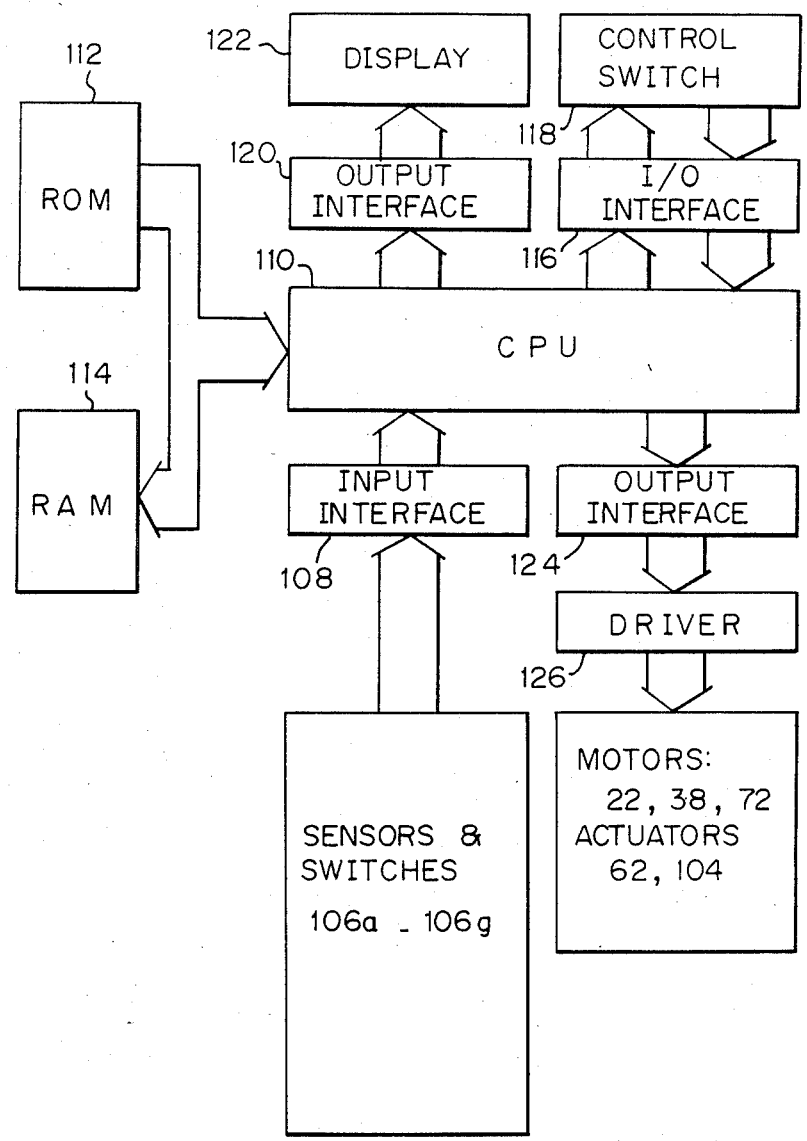
FIG. 4 is a block diagram showing a preferred example of a control system for use in the disc loading and exchanging apparatus embodying the present invention.

During playback of the disc D in the disc retainer 92, the central processing unit 110 of the control system illustrated in FIG. 4 determines, on the basis of the signal from the switch unit 118, whether or not there is a second disc to be selected from the stock of the discs D. This stage of the player operation is represented as step 7 in the flowchart of FIG. 5. If it is found in this step 7 that there is no second disc to be selected and played back, the control system maintains a wait condition pending the termination of the playback operation. When the playback operation comes to an end as in step 8 indicated in the flowchart of FIG. 5, the solenoid-operated actuator unit 104 is de-energized to permit the disc clamper 96 to be disengaged from the disc D in the disc retainer 92 as in step 9 indicated in the flowchart of FIG. 5. The motor 72 is then actuated to drive the slider 68 from the foremost position to the rearmost position on the carriage 36 so that the disc D in the disc retainer 92 is transferred back to the gap 60 in the disc carrier 56 on the carriage 36 by means of the front press roller 90 on the slider 68, this stage of the player operation being represented as step 10 in the flowchart of FIG. 5. The step 10 is followed by step 11 in which the motor 38 is actuated to drive the carriage 36 to move in the direction of the arrow a' to the previously mentioned target position with respect to the array of the discs D in stock. When the carriage 36 is moved back to this position with respect to the array of the discs D, the motor 72 is actuated to drive the slider 68 for movement from the rearmost position to the foremost position on the carriage 36 so that the disc D in the gap 60 of the disc carrier 56 is transferred back to the array of the discs D in stock by means of the rear press roller 90' on the carriage 36. This stage of the player operation is represented as step 12 in the flowchart of FIG. 5. Upon completion of the step 12, the motor 38 is actuated to drive the carriage 36 for movement to the initial home position thereof, this final stage of the player operation being represented as step 13 in the flowchart of FIG. 5.

Figure 7D:
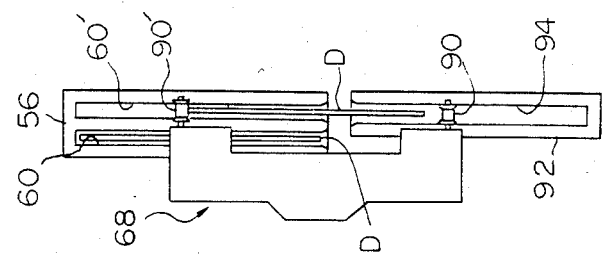
FIGS. 7A to 7D are views showing members of the apparatus embodying the present invention under conditions in which two discs are to be exchanged in the position ready to be played back.
Figure 7C:
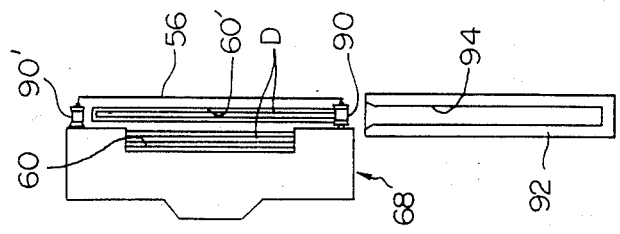
Figure 7B:
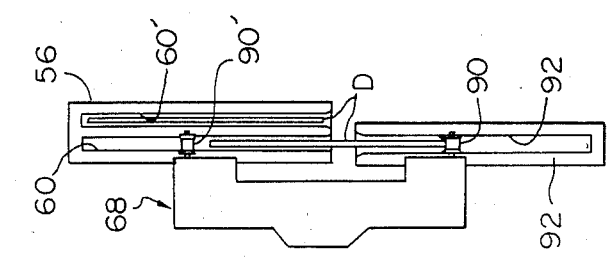
Figure 7A:
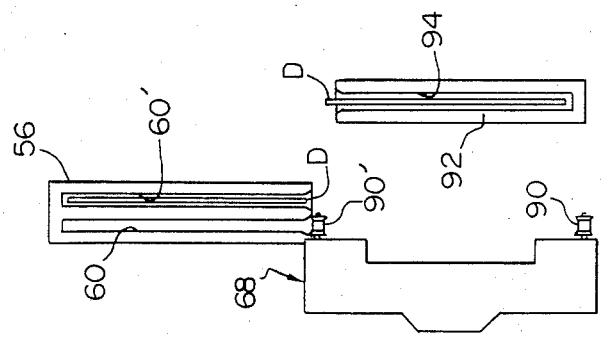

If it is found in the step 7 that there is a second disc to be selected and played back, the motor 38 is actuated to drive the carriage 36 for movement along the guide bar 30 in the direction of the arrow a' (FIG. 1) to a target position corresponding to the second selected disc. This stage of the player operation is represented as step 14 in the flowchart of FIG. 5 and is accomplished while the reproduction of the first selected disc is in progress by means of the disc information pickup unit. When the carriage 36 reaches the target position corresponding to the second selected disc D, the solenoid-operated actuator unit 62 supported on the carriage 36 (FIG. 2) is energized on the basis of a signal fed from the central processing unit 110 (FIG. 5) and drives the disc carrier 56 to move with respect to the carriage 36 to a position in which the second gap 60' in the disc carrier 56 is vertically aligned with the press rollers 90 and 90' on the slider 68. This stage of the player operation is represented as step 15 in the flowchart of FIG. 5. The step 15 is followed or accompanied by step 16 in which the motor 72 is actuated to drive the slider 68 for movement from the rearmost position to the foremost position above the stock of the discs D. When the slider 68 reaches the foremost position on the carriage 36, the press rollers 90 and 90' carried on the slider 68 are located in alignment with the second selected disc D. The motor 72 is then actuated to drive the carriage 36 for movement backwardly from the foremost position to the rearmost position on the carriage 36 which is held at rest. The front press roller 90 on the slider 68 is brought into engagement with the edge of the second selected disc D so that the particular disc D is transferred from the stock of the discs D into the second gap 60' in the disc carrier 56. Upon completion of the step 16, the solenoid-operated actuator unit 62 is de-energized to permit the disc carrier 56 to move back with respect to the slider 68 to the initial position having the first gap 60 aligned with the press rollers 90 and 90' as shown in FIG. 7A of the drawings. While the disc carrier 56 is being thus moved back to the initial position thereof with respect to the carriage 36, the motor 72 is actuated to drive the slider 68 for movement from the rearmost position to the foremost position on the carriage 36 so that the press rollers 90 and 90' on the slider 68 are located in above the array of the discs D in stock. The motor 38 is then actuated to drive the carriage 36 for movement along the guide bar 30 in the direction of the arrow a toward the disc retainer 92 of the disc retaining means 14 until the first gap 60 in the disc carrier 56 is brought into alignment with the gap 94 in the disc retainer 92. These stages of the player operation are represented as step 17 in the flowchart of FIG. 5. The carriage 36 is maintained in this position with respect to the disc retainer 92 until the playback operation with the first selected disc D comes to an end as in step 18 indicated in the flowchart of FIG. 5. The slider 68 being held in the foremost position on the carriage 36 held in this position with respect to the disc retainer 92, the press rollers 90 and 90' on the slider 68 are located to be ready to engage the disc D being played back.

When the playback operation with the first selected disc D is terminated, the solenoid-operated actuator unit 104 is de-energized to permit the disc clamper 96 to be disengaged from the disc D in the disc retainer 92 as in step 19 indicated in the flowchart of FIG. 5. The motor 72 is then actuated to drive the slider 68 for movement from the foremost position to the rearmost position on the carriage 36. The front press roller 90 on the carriage 36 is thus brought into engagement with the edge of the disc D in the disc retainer 92 and causes the disc D to move out of the gap 94 in the disc retainer 92 into the first gap 60 in the disc carrier 56 as indicated in FIG. 7B of the drawings. After the first selected disc D is transferred completely from the gap 94 in the disc retainer 92 into the first gap 60 in the disc carrier 56, the solenoid-operated actuator unit 62 is energized to drive the disc carrier 56 for movement with respect to the carriage 36 to a position in which the second gap 60' in the disc carrier 56 is aligned with the press rollers 90 and 90' on the slider 68 and with the gap 94 in the disc retainer 92 as shown in FIG. 7C of the drawings. The motor 72 is then actuated to drive the slider 68 for movement from the rearmost position to the foremost position on the carriage 36 with the result that the rear press roller 90' on the carriage 36 is brought into engagement with the edge of the disc D in the second gap 60' in the disc carrier 56 and causes the disc D to move out of the gap 60' in the disc carrier 56 into the gap 94 in the disc retainer 92 as indicated in FIG. 7D of the drawings. These stages for the exchange of the discs in the disc retainer 92 are represented as step 20 in the flowchart of FIG. 5. After the second selected disc D is thus transferred completely from the gap 60' in the disc carrier 56 into the gap 94 in the disc retainer 92, the solenoid-operated actuator unit 104 is energized to drive the disc clamper 96 to turn about the pivot pin 99 (FIG. 3) so that the clamp member 102 on the bell-crank lever 98 is brought into pressing engagement with the second selected disc D in the disc retainer 92 and causes the disc D to fit to the spindle connected to the output shaft 24 of the disc drive motor 22. The disc drive motor 22 and the disc information pickup unit are then put into operation to start the reproduction of the selected piece of information from the second selected disc D. These stages of the player operation are represented as step 21 in the flowchart of FIG. 5.

During playback of the second selected disc D, the central processing unit 110 of the control system illustrated in FIG. 4 determines whether or not there is a third disc to be selected from the stock of the discs D. This stage of the player operation is represented as step 22 in the flowchart of FIG. 5. If it is found in this step 22 that there is no third disc to be selected and played back, the step 22 is followed by the previously described steps 8 to 13. In this instance, the steps 11 and 12 are repeated each twice so that the discs D in both of the first and second gaps 60 and 60' in the disc carrier 56 are returned in succession to the array of the discs D in stock.

If it is found in the step 22 that there is a third disc to be selected and played back, the motor 38 is actuated to drive the carriage 36 for movement to the position in which the first selected disc D received in the first gap 60 in the disc carrier 56 is to be returned to the array of the discs D in stock. This stage of the player operation is represented as step 23 in the flowchart of FIG. 5. When the carriage 36 reaches this position, the motor 72 is put into operation to drive the slider 68 for movement from the rearmost position to the foremost position thereof on the carriage 36 and thus returns the first selected disc D to the array of the discs D. This stage is represented as step 24 in the flowchart of FIG. 5 and is followed by the steps 14 and 15 to pick up the third selected disc from the stock of the discs D into the first gap 60 in the disc carrier 56 and further by the steps 16 and 17 to move the third selected disc D to the position ready to be transferred to the disc retainer 92 until the reproduction of the second selected disc is terminated (step 18). If there is still another disc to be selected and played back, the procedure including the steps 23, 24 and 14 to 17 is repeated until reproduction of the last selected disc is complete. Upon completion of the playback operation, the step 22 is followed by the steps 8 to 13 so as to put an end to the operation of the disc loading and exchanging apparatus.

While only one preferred embodiment of a disc loading and exchanging apparatus according to the present invention has been described with reference to the drawings, it should be borne in mind that the embodiment described is simply illustrative of the gist of the invention and may thus be modified in numerous manners if desired. Such modifications of the embodiment described may include the following examples.

(1) While discs D are used in unpackaged condition in the embodiment described, the embodiment can be readily modified to be capable of handling packaged discs.

(2) The disc drive unit 10 and the disc retaining means 14 in the shown embodiment are positioned on the same horizontal plane on which the disc storage means 12 is positioned but may be positioned either above or below the disc storage means 12. This modified arrangement will contribute to reducing the width of the apparatus as a whole.

(3) The carriage 36 which forms part of the disc transport means 16 has only two gaps 60 and 60' but may be modified to have three or more gaps. This modified disc carrier is capable of conveying three or more discs at a time between the disc storage means 12 and the disc retaining means 14 and will lend itself to reducing the power consumption required for the travel of the carriage 36 and the slider 68.

(4) The drive means for the disc carrier 56 and the drive means for the disc clamper 96 are constituted by the solenoid-operated actuator units 62 and 104, respectively, in the embodiment described but may use small-sized dc motors of the reversible type.

(5) The disc carrier 56 is arranged to be movable with respect to the slider 68 but may be fixed with respect to the slider 68. In this instance, the drive means such as the solenoid-operated actuator unit 62 and the guide means such as the guide members 58 for the disc carrier 56 can be dispensed with and the carriage 36 is driven for movement with respect to the disc retainer 92 during exchange of discs between the disc carrier 56 and disc retainer 92.

While the disc loading and exchanging apparatus embodying the present invention has been hereinbefore described as being used in a video and/or audio disc player, it will be apparent that an apparatus according to the present invention is applicable not only to a video and/or audio disc player but also to any other types of systems and devices using information carrying discs such as computers and word processors.

What is claimed is:

1. An automatic disc loading and exchanging apparatus of a disc reproducing system including disc drive means associated with disc information pickup means, comprising:

disc storage means for storing a plurality of discs in conjunction with said disc drive means, the disc storage means being adapted to have discs arranged in an array having the individual discs positioned in parallel with each other and aligned with one another in a predetermined direction, disc retaining means adapted to retain a disc in a position to be driven for rotation by said disc drive means, and disc transport means movable in a direction parallel with said predetermined direction independently of said disc retaining means and including a disc carrier adapted to carry at least two discs and movable in opposite directions in parallel with said predetermined direction, and first and second pressing rollers which are movable in opposite directions perpendicular to said predetermined direction and which are spaced apart from each other in a direction perpendicular to said opposite directions of movement of said disc carrier, said first pressing roller being engageable with one edge portion of each of the discs for causing the disc to transfer to the carrier when the first pressing roller is moved on one of said opposite directions thereof and the second pressing roller being engagable with another edge portion of each of the discs for causing the disc to withdraw from the carrier when the second pressing roller is moved in the other of said opposite directions thereof, the disc transport means and the disc carrier thereof being movable between a first position operative to have a disc transferred between said array of the discs and said disc carrier and a second position operative to have a disc transferred between the disc carrier and said disc retaining means, the first position being variable depending upon the disc to be transferred between said array of the discs and said disc carrier, and said second position being fixed with respect to said disc retaining means, said disc transport means further including a carriage movable in a direction parallel with said predetermined direction, and a slider movable with respect to the carriage in opposite directions substantially perpendicularly to the direction of movement of the carriage, said first and second pressing rollers being mounted on said slider, and said disc carrier being movable with said carriage in parallel with said predetermined direction and having at least two parallel open spaces separate from each other and each adapted to have a disc received therein, said disc retaining means comprising a disc retainer positioned in association with said disc drive means and formed with at least one open space adapted to have a disc received therein in a position ready to be engaged by the disc drive means, said open spaces in said disc carrier being open toward said array of the discs when said disc transport means is in said first position, one of said open spaces in said disc carrier being open toward and substantially aligned with said open space in said disc retainer when said disc transport means is in said second position, and said disc carrier being movable between at least two different positions with respect to said carriage in a direction parallel with the direction of movement of said carriage, each of said two different positions being a position in which said pressing rollers are aligned with a respective one of said open spaces in said disc carrier, one of the open spaces in the carrier being substantially aligned with said open space in said disc retainer when said disc transport means is in said second position and said disc carrier is in one of said two different positions, and the other of the open spaces in the disc carrier being substantially aligned with the open space in the disc retainer when said disc transport means is in said second position and said disc carrier is in the other of said two different positions.

2. An automatic disc loading and exchanging apparatus as set forth in claim 1, in which said disc storage means and said disc retaining means are positioned on the plane on which said disc drive means is positioned.

3. An automatic disc loading and exchanging apparatus as set forth in claim 2, in which said array of the discs has an axis therethrough in said predetermined direction and in which said disc retaining means has an axis therethrough, the axis of the array of the discs being substantially aligned with the axis of said disc retaining means.

4. An automatic disc loading and exchanging apparatus as set forth in claim 1, in which each of said disc carrier and said slider is supported on said carriage.

5. An automatic disc loading and exchanging apparatus as set forth in claim 1, in which each of said disc carrier and said slider is movably supported on said carriage and in which said disc transport means further comprises drive means operative to drive said slider for movement selectively in one of said opposite directions thereof with respect to said carriage, said drive means comprising a motor for producing rotational motion about an axis fixed with respect to said carriage and first and second pulley arrangements each including two cooperative pulleys, each of which is rotatable about an axis fixed with respect to said carriage, one of the pulleys of the first pulley arrangement being rotatable with one of the two pulleys of the second pulley arrangement and being associated with said drive means for being driven for rotation about the axis thereof, the first pulley arrangement further including an endless flexible line operatively passed between the two pulleys of the first pulley arrangement, the second pulley arrangement further including a flexible line which is operatively passed between the two pulleys of the second pulley arrangement and which is anchored at its ends to said slider.

6. An automatic disc loading and exchanging apparatus as set forth in claim 5, in which the two pulleys of said second pulley arrangement are spaced apart from each other generally in a direction perpendicular to said predetermined direction.

7. An automatic disc loading and exchanging apparatus as set forth in claim 5, in which said drive means further comprises a pair of tension springs by means of which said flexible line of said second pulley arrangement is anchored at its ends, respectively, to said slider.

8. An automatic disc loading and exchanging apparatus of a disc reproducing system including disc drive means associated with disc information pickup means, comprising:

disc storage means for storing a plurality of discs in conjunction with said disc drive means, the disc storage means being adapted to have discs arranged in an array having the individual discs positioned in parallel wiht each other and aligned with one another in a predetermined direction, disc retaining means adapted to retain a disc in a position to be driven for rotation by said disc drive means, and disc transport means movable in a direction parallel with said predetermined direction independently of said disc retaining means and including a disc carrier adapted to carry at least two discs and movable in opposite directions in parallel with said predetermined direction, and first and second pressing elements which are movable in opposite directions perpendicular to said predetermined direction and which are spaced apart from each other in a direction perpendicular to said opposite directions of movement of said disc carrier, said first pressing element being engageable with one edge portion of each of the discs for causing the disc to transfer to the carrier when the first pressing element is moved in one of said opposite directions thereof and the second pressing element being engageable with another edge portion of each of the discs for causing the disc to withdraw from the carrier when the second pressing element is moved in the other of said opposite directions thereof, the disc transport means and the disc carrier thereof being movable between a first position operative to have a disc transferred between said array of the discs and said disc carrier and a second position operative to have a disc transferred between the disc carrier and said disc retaining means, the first position being variable depending upon the disc to be transferred between said array of the discs and said disc carrier, and said second position being fixed with respect to said disc retaining means, said disc transport means further including a carriage movable in a direction parallel with said predetermined direction, said disc carrier being movable with said carriage in parallel with said predetermined direction and having at least two parallel open spaces separate from each other and each adapted to have a disc received therein, said disc retaining means comprising a disc retainer positioned in association with said disc drive means and formed with at least one open space adapted to have a disc received therein in a position ready to be engaged by the disc drive means, said open spaces in said disc carrier being open toward said array of the discs when said disc transport means is in said first position, with one of said open spaces in said disc carrier being open toward and substantially aligned with said open space in said disc retainer when said disc transport means is in said second position, and said disc carrier being movable between at least two different positions with respect to said carriage in a direction parallel with the direction of movement of said carriage, each of said two different positions being a position in which said pressing elements are aligned with a respective one of said open spaces in said disc carrier, one of the open spaces in the carrier being substantially aligned with said open space in said disc retainer when said disc transport means is in said second position and said disc carrier is in one of said two differenct positions, and the other of the open spaces in the disc carrier being substantially aligned with the open space in the disc retainer when said disc transport means is in said second position and said disc carrier is in the other of said two different positions.

* * * * *